Patented Mar. 24, 1942

2,277,480

UNITED STATES PATENT OFFICE 2,277,480

UREA - FORMALDEHYDE - CHLORINATED ACETALDEHYDE CONDENSATION PRODUCTS

Gaetano F. D'Alelio, Pittsfield, Mass., assignor to General Electric Company, a corporation of New York No Drawing. Application August 9, 1939, Serial No. 289,275

12 Claims. (Cl. 260—68)

This invention relates to new condensation products and to methods of making the same. The invention is concerned more particularly with self-curing aminoplasts, by which is meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing a urea, a non-halogenated aliphatic aldehyde, for example formaldehyde, and a halogenated aldehyde, specifically a chlorinated acetaldehyde (e. g., monochloroacetaldehyde), including the hydrated chlorinated acetaldehydes (e. g., chloral hydrate). The initial condensation may be carried out at normal or at elevated temperatures, in the presence or absence of a condensation catalyst and under alkaline, neutral or acid conditions.

The urea component (aldehyde-reactable organic compound of the urea system) may be, for instance, urea ($NH_2CONH_2$) itself; thiourea; iminourea (guanidine); aldehyde-reactable; substituted ureas, thioureas and iminoureas such as methyl urea, acetyl urea, benzoyl urea, phenyl thiourea, asymmetrical diethyl urea, allyl urea, 2-chloro-allyl urea, ethylidine urea, methylol urea, methylene urea, dicyandiamide, guanylurea, guanylthiourea, biguanidine, aminoguanidine, creatine (guanidine methyl glycine) and guanoline (guanido carbonic ethyl ester). Terms such as "a urea," "urea component" and "urea substance," as used generally herein and in the appended claims, have reference to and mean an aldehyde-reactable organic compound of the urea system, numerous examples of which have been given hereinbefore.

In producing the new condensation products, which may be described more specifically as co-condensation products, the choice of the non-halogenated aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention, the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts. Sodium hydroxide and carbonate and calcium hydroxide are examples of fixed alkalies (alkaline substances).

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated aldehyde to a partial condensation product of a urea and a non-halogenated aliphatic aldehyde and effect further condensation between the components. Or, I may first condense the halogenated aldehyde with a urea, add the resulting product to a partial condensation product of a urea and a non-halogenated aliphatic aldehyde and then cause the reaction to proceed further. Or, I may condense or partially condense a halogenated aldehyde with an excess of a urea in solution and to this solution add a non-halogenated aliphatic aldehyde in quantities such that there is at least one mole of the non-halogenated aliphatic aldehyde for each mole excess of the urea over the halogenated aldehyde and effect further condensation between the components. Or, if the halogenated aldehyde molecule itself contains an aldehyde-reactable group such as a

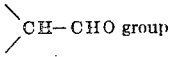CH—CHO group it may first be partially condensed with at least a mole excess of a non-halogenated aliphatic aldehyde, a urea added to this condensation product and further reaction effected between the components. Still other ways may be employed in combining the components and in producing the unmodified or modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified or unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration:

*Example 1*

| | Parts by weight |
|---|---|
| Urea | 60.0 |
| Aqueous ammonia (28%) | 7.6 |
| Aqueous formaldehyde (approximately 37.1% HCHO) (approximately 60 parts HCHO) | 161.0 |
| Sodium hydroxide (in 1 part of water) | 0.04 |
| Chloral hydrate | 1.0 |

All of the above components were mixed together with the exception of the halogenated acetaldehyde, specifically chloral hydrate, and heated under reflux for 20 to 30 minutes. The above stated amount of chloral hydrate was added to the syrup thus obtained and the mass again heated under reflux for an additional 10 minutes to effect further condensation. The resulting resin syrup formed a curing resin on the hot plate at 150° C. The syrup was mixed with 61 parts alpha flock and 0.4 part zinc stearate and the mixture dried at 50° C. to form a molding composition. The dried composition was molded under pressure (2000 to 3000#/in.² approximately) at 130° C. to form molded articles of very good characteristics.

Example 2

The same formulation as in Example 1 except that 3 parts chloral hydrate were used. The components were mixed and heated under reflux for 3½ minutes. The clear hot syrup was mixed with alpha flock and zinc stearate as before, and the molding composition was dried at 50° C Under the application of heat and pressure molded articles similar to those of Example 1 were obtained.

Example 3

The same formulation as in Example 1 except that 4 parts chloral hydrate were used. All of the components with the exception of the chloral hydrate were mixed and heated under reflux for 20 to 30 minutes. This partial condensation product was mixed with 61 parts alpha flock and 0.4 part zinc stearate and very carefully dried. An alcoholic solution of the 4 parts chloral hydrate was added to the compound and the alcohol-moist compound heated to effect further condensation between the components. The resulting composition converted rapidly to a hardened state upon the application of heat and pressure.

Example 4

| | Parts by weight |
|---|---|
| Urea | 60 |
| Aqueous formaldehyde (37.1% approx.) | 161 |
| Chloral hydrate | 1 |

The above components were mixed in the order given and heated to boiling. The hot syrup was mixed with alpha flock and zinc stearate to form a molding composition.

Condensation products of urea and formaldehyde alone, prepared as described under Examples 1 to 3, inclusive, but not inter-condensed with the specific halogenated aldehyde mentioned in the individual example are heat-nonconvertible. In other words, they will not cure under heat or under heat and pressure to the insoluble infusible state.

It will be understood, of course, that the chloral hydrate mentioned in the above examples is only by way of illustration and that various other halogenated aldehydes may be used in carrying this invention into effect, e. g., monochloroacetaldehyde, dichloroacetaldehyde, trichloroacetaldehyde (chloral).

In certain cases, it may be advantageous to use a single halogenated aldehyde with a plurality of urea substances. Thus, to modify the characteristics of the molded poduct I may use a mixture of, for example, urea and dicyandiamide, with a single halogenated aldehyde. In other cases, instead of using a single halogenated aldehyde, I may use a plurality of halogenated aldehydes with a single urea substance or with a plurality of urea substances.

The ratio of the reactants to each other may be considerably varied but, in general, it is desirable to use at least one mole of total aldehyde (i. e., the sum of halogenated aldehyde and non-halogenated aliphatic aldehyde) for each mole of urea substance. In producing the heat-convertible resinous condensation products of this invention, the proportion of halogenated aldehyde in all cases is at least sufficient to impart self-curing characteristics to the resin. If the halogenated aldehyde is also aldehyde-reactable it is desirable to have at least one-fourth mole non-halogenated aliphatic aldehyde for each one-fourth mole halogenated aldehyde. The molar proportion of halogenated aldehyde should not be substantially more than one-fourth of the total moles of aldehyde. The use of higher amounts of halogenated aldehydes is undesirable for most molding applications because of the greater difficulty in obtaining molded articles of suitable hardness, but may not be objectionable for other applications of the material. Also, in some cases, particularly where high molecular weight halogenated aldehydes, as for example alpha bromostearyl aldehyde, are used, the halogenated aldehyde portion of the resin molecule exceeds on a mole weight basis the urea portion of the molecule. Consequently, in such cases the inherent characteristics (for example, waxy nature) of the high molecular weight halogenated aldehyde predominate in the resin molecule. This may be objectionable in some applications of the molded part, for example where resistance to the ordinary organic solvents is required. No advantage accrues from using an amount of halogenated aldehyde above the minimum required to secure the desired curing rate.

From the foregoing it will be seen that the particular mole ratio of halogenated aldehyde to the other components is dependent somewhat upon the inherent characteristics of the halogenated aldehyde and the curing characteristics and other properties desired in the heat-convertible and heat-hardened resinous condensation products. Thus, in producing these new condensation products I may cause to react ingredients comprising essentially (1) a urea (specifically the organic compound corresponding to the formula $NH_2CONH_2$), (2) an aliphatic aldehyde, e. g., formaldehyde, and (3) a halogenated aldehyde or derivative thereof, e. g., chlorinated acetaldehyde, chloral hydrate, etc., in the ratio of one mole of the urea, at least one mole of the aliphatic aldehyde of (2) and a small amount not exceeding substantially one-fourth mole of the halogenated aldehyde of (3), the aldehyde of (3) being distinct from the aldehyde of (2). For molding applications the ratio of the non-halogenated aliphatic aldehyde to urea substance may be considerably varied, but generally will be within the range of 1½ to 2½ moles non-halogenated aliphatic aldehyde for each mole of urea substance. No particular advantage ordinarily accrues from the use of higher amounts of non-halogenated aliphatic aldehyde. Approximately 2 moles aliphatic aldehyde per mole urea substance usually gives very satisfactory results, particularly from the view-point of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylic acid amides (acrylamides), benzamide, toluene sulfonamide, etc.; polyamides such as adipic diamide, phthalamide and the like; amines such as ethylene diamine, aniline, phenylene diamine, amino phenols, etc.

The modifying bodies also may take the form of higher molecular weight bodies, with or without resinous characteristics, for example, partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified or unmodified products of this invention have a wide variety of other uses, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States is:

1. A product comprising the cured resinous condensation product of claim 10.

2. A condensation product of ingredients consisting essentially of the following components in the stated molar ratios: (1) one mole urea, (2) at least one mole of formaldehyde and (3) a small amount not exceeding substantially one-fourth mole of a chlorinated acetaldehyde.

3. A heat-hardenable resinous product obtained by reacting under heat ingredients consisting essentially of (1) the partial condensation product obtained by reaction under heat, under alkaline conditions, of a mixture consisting essentially of urea and formaldehyde in the ratio of one mole of the former to from one and one-half to two and one-half moles of the latter and (2) a chlorinated acetaldehyde in a small amount not exceeding substantially one-fourth of the total moles of said chlorinated acetaldehyde plus the formaldehyde reactant of (1).

4. A composition comprising a soluble, fusible condensation product of ingredients consisting essentially of the following components in the stated molar ratios: (1) one mole urea, (2) at least one mole formaldehyde, and (3) a small amount not exceeding substantially one-fourth mole chloral hydrate.

5. A composition comprising the product obtained by reacting under heat ingredients consisting essentially of (1) the partial condensation product obtained by reaction under heat, while admixed with an alkaline substance comprising ammonia, of ingredients consisting essentially of urea and formaldehyde in the ratio of one mole of the former to at least one mole of the latter and (2) a chlorinated acetaldehyde in a small amount not exceeding substantially one-fourth of the total moles of said chlorinated acetaldehyde and formaldehyde.

6. A composition comprising the product obtained by reacting under heat ingredients consisting essentially of (1) the partial condensation product obtained by reaction under heat, in the presence of alkaline substances comprising ammonia and sodium hydroxide, of ingredients consisting essentially of urea and formaldehyde in the ratio of one mole of the former to from one and one-half to two and one-half moles of the latter and (2) chloral hydrate in a small amount not exceeding substantially one-fourth of the total moles of said chloral hydrate and formaldehyde.

7. A composition comprising the product obtained by reacting under heat ingredients consisting essentially of from 1 to 4 parts by weight chloral hydrate with the partial condensation product obtained by reaction under heat, under alkaline conditions, of ingredients consisting essentially of 60 parts by weight urea and 60 parts by weight formaldehyde.

8. The method which consists in the steps of (1) effecting partial reaction under heat between ingredients consisting essentially of urea and formaldehyde in the ratio of one mole of the former to at least one mole of the latter and while admixed with an alkaline substance comprising ammonia, (2) adding to the resulting partial condensation product a chlorinated acetaldehyde in a small amount not exceeding substantially one-fourth of the total moles of said chlorinated acetaldehyde and formaldehyde, and (3) causing the said chlorinated acetaldehyde to intercondense with the said partial condensation product.

9. The method which consists in the steps of (1) effecting partial reaction under heat between ingredients consisting essentially of urea and formaldehyde in the ratio of one mole of the former to from one and one-half to two and one-half moles of the latter and under alkaline conditions due to the presence of both ammonia and sodium hydroxide, (2) adding to the resulting partial condensation product chloral hydrate in a small amount not exceeding substantially one-fourth of the total moles of said chloral hydrate and formaldehyde, and (3) causing the said chloral hydrate to intercondense with the said partial condensation product.

10. A heat-convertible resinous condensation product of ingredients consisting essentially of (1) urea, (2) formaldehyde and (3) a chlorinated acetaldehyde, said aldehydes of (2) and (3) being present in an amount corresponding to at least one mole of the total aldehyde for each mole of urea, and said chlorinated acetaldehyde being present in a small amount not exceeding substantially one-fourth of the total moles of the aldehydes of (2) and (3).

11. A heat-curable resinous composition comprising a soluble, fusible condensation product of ingredients consisting essentially of the following components in the stated molar ratios: (1) one mole urea, (2) from one and one-half to two and one-half moles formaldehyde and (3) a small amount not exceeding substantially one-fourth mole of a chlorinated acetaldehyde, the said chlorinated acetaldehyde accelerating the conversion under heat of the said condensation product to an insoluble and infusible state.

12. The method of producing a heat-curable resinous composition which consists in reacting under heat to resin formation ingredients consisting essentially of the following components in the stated molar ratios: (1) one mole urea, (2) at least one mole formaldehyde and (3) a small amount not exceeding substantially one-fourth mole of a chlorinated acetaldehyde, the said chlorinated acetaldehyde accelerating the conversion under heat of the said resinous composition to a cured state.

GAETANO F. D'ALELIO.